Feb. 16, 1965 H. B. WILSON ETAL 3,169,458
METHOD AND APPARATUS FOR COMPOSING MUSIC COPY
Filed March 28, 1961 9 Sheets-Sheet 4

INVENTORS
Henry Blake Wilson
& Allen W. Mickel
BY Connolly and Hutz
ATTORNEYS

Feb. 16, 1965   H. B. WILSON ETAL   3,169,458
METHOD AND APPARATUS FOR COMPOSING MUSIC COPY
Filed March 28, 1961   9 Sheets-Sheet 6

INVENTORS
Henry Blake Wilson
& Allen W. Mickel
BY Connolly and Hutz
ATTORNEYS

United States Patent Office

3,169,458
Patented Feb. 16, 1965

3,169,458
METHOD AND APPARATUS FOR COMPOSING MUSIC COPY
Henry Blake Wilson, Wilmington, Del., and Allen W. Mickel, Chadds Ford, Pa., assignors to Kaumagraph Company, Wilmington, Del., a corporation of Delaware
Filed Mar. 28, 1961, Ser. No. 98,959
20 Claims. (Cl. 95—4.5)

This invention relates to a method and apparatus for composing music copy by photographic means, and it more particularly relates to such a method and apparatus which utilize a contact photographic process.

Fine music copy has been produced for centuries by means of hand-engraved metal plates prepared by expert engravers who must have many years of training. In recent years attempts have been made to provide newer methods and apparatus, which are better adapted to rapid mass production, such as numerous varieties of musical typewriters. However, none of these typewriters can compose copy precisely enough to satisfy the needs of discriminating musicians, particularly where the music is complicated. The notes of fine music copy must be evenly spaced in integral measures upon each line, and extreme accuracy is required in the application of bridging symbols such as slurs and hooks. Anything short of perfection in the production of fine music copy is unacceptable.

An object of this invention is to provide an automatic method and apparatus for composing music copy for reproduction which is rapid and consistently accurate.

Another object is to provide such a method and apparatus which utilizes photographic composing and reproducing methods; and A further object is to provide such a method and apparatus which can be practiced and operated by relatively unskilled operators.

In accordance with this invention a substantially accurately spaced layout of each line of the copy is prepared. The notes and symbols of this copy are then exposed upon a light-sensitive material in positions substantially corresponding to their arrangement upon the layout in a lateral spacing providing an integral number of measures upon each line. An accurate record is kept of the vertical and lateral spacing of each of the exposed notes at a location visible to the operator. This record may be the layout itself if it is extremely accurately drawn with respect to lateral spacing, or it may preferably be an actual record of the exposed positions of the notes themselves. The bridging symbols are exposed in positions and angular orientations corresponding to the accurate record of the vertical and lateral spacings of the exposed notes. The lines of copy are then assembled to form a sheet of music copy, and this sheet is photographed upon a photoreproduction master which is used to print the sheets of music in accordance with any available photographic reproduction method such as photolithography.

A unique apparatus for practicing this method includes a light source mounted over a table upon which a light-sensitive sheet is mounted. A feeding means selects predetermined light-passing musical symbol images from the magazine and places them at an exposure station between the light source and the sensitive material to print selected symbols upon this material. A vertical and lateral translating means reacts between the exposure station and the table to vary their vertical and lateral orientation relative to a staff positioned upon the table for placing the symbols and notes in their proper positions relative to a staff applied to the light-sensitive material. A reference surface, which is visible to an operator, extends from the table and a reference arm connected to the exposure station extends over the reference surface for providing a visible indication of the relative positions of the station and the light-sensitive material. This permits accurate corresponding relationships to be maintained between the exposure station and light-sensitive material, which makes it possible to accurately space the symbols in their correct positions and to accurately apply the bridging symbols to the notes which require them.

The symbol magazine of this apparatus may conveniently incorporate a turntable including a disc with symbol images disposed about its periphery in several rows. This turntable can be laterally shifted relative to the printing station, to utilize each of the rows of images upon the disc and can be automatically actuated to select the proper symbol for exposure by means of powered rotation through a slip-clutch. The rotation of the turntable can be arrested by actuation of one of a radial array of keys which engage a projection connected to the turntable. The vertical and lateral translating means may include a table-driving lead screw for actuating a vertical movement of the table relative to the exposure station and the lateral translating means can include a manually operable rack and pinion transmission reacting between the frame of the apparatus and a movable support for the exposure station. An operator can thereby infinitely vary the lateral spacing of the applied symbols. The lateral translating means may be resiliently biased to an extreme position to which it can automatically return, and movement of the exposure station relative to the table can be actuated by a pair of pinions which are respectively connected through a slip-clutch to a manually operable lever and a magnetic brake for resisting the aforementioned resilient bias.

The vertical translating means may conveniently be actuated through a pair of oppositely rotating electric motors connected through the table-driving lead screw through slip clutches which are actuated by a unique control arrangement incorporating a pair of rows of opposite contact brushes corresponding to each vertical staff position. These rows are engaged by a moving contact bar including a pair of separated elongated contact bars on one side for controlling the alternate actuation of the slip clutches and a central contact on its other side which operates indexing fingers. These indexing fingers insure accurate vertical staff positioning of the table engaging a disc bearing projections. This disc is connected to the table-driving lead screw to insure that it stops each time at a precise staff position.

A reference plate incorporating guide surfaces for inscribing an accurate record of the portion of each exposed symbol upon the reference surface may conveniently be attached to the reference arm by a convenient movable means such as a hinge. A unique and convenient fixture for applying the bridging symbols which may be considered as part of the symbol magazine may incorporate a pair of frames rotatably mounted upon a plate and connected by a linkage which maintains them synchronized in corresponding angular orientations. One of these frames is used as an exposure frame, and it is disposed between the light source and light-sensitive material. The other frame is a reference frame, and it is disposed upon the reference surface of the table. Light-passing images of bridging symbols such as slurs and hooks are inserted in the exposure frame, and reference indicia are inscribed upon the reference frame to permit the exposure frame to be accurately oriented with respect to the exposed notes in positions corresponding to the record disposed upon the reference surface. This bridging symbol fixture may also include a pair of parallel bars which conveniently cut off the sides of a hook image in accordance with the distance between the notes which they bridge to provide a remarkably accurate and true configuration for such hooks regardless of angular orientation. The base plate of this fixture engages the table, to accurately position it relative to the table and exposure station.

The table may include a platen which can be raised above it, and the light-sensitive material is mounted upon this platen to permit it to be raised into contact with the image symbol to facilitate dependable contact photographic printing of the musical symbols upon it.

Novel features and advantages of the present invention will become apparent to one skilled in the art from a reading of the following description in conjunction with the accompanying drawings wherein similar reference characters refer to similar parts and in which.

Figures 1, 1A:
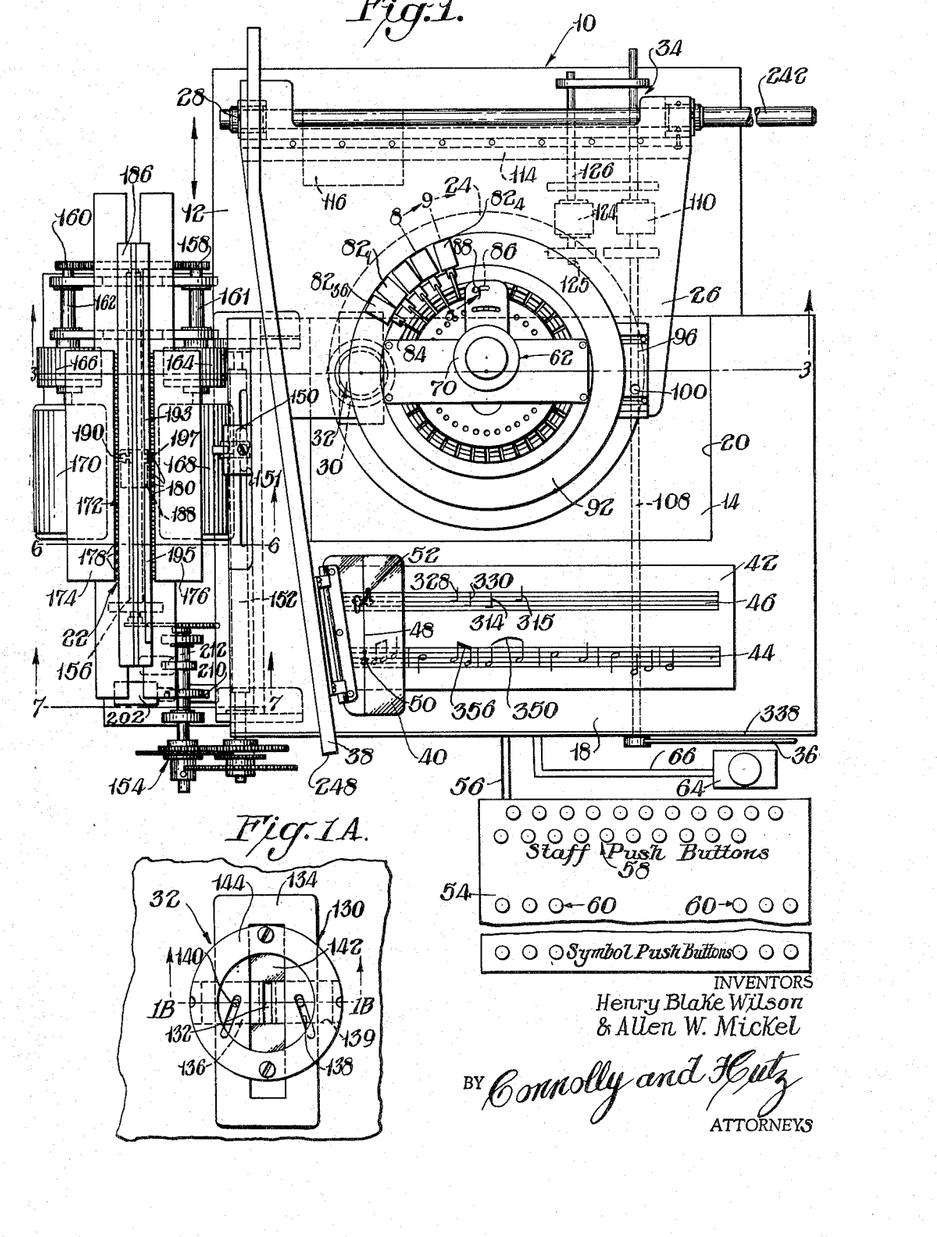
FIG. 1 is a plan view of one embodiment of this invention.
FIG. 1A is an enlarged plan view of a portion of the embodiment shown in FIG. 1.
Figure 3:
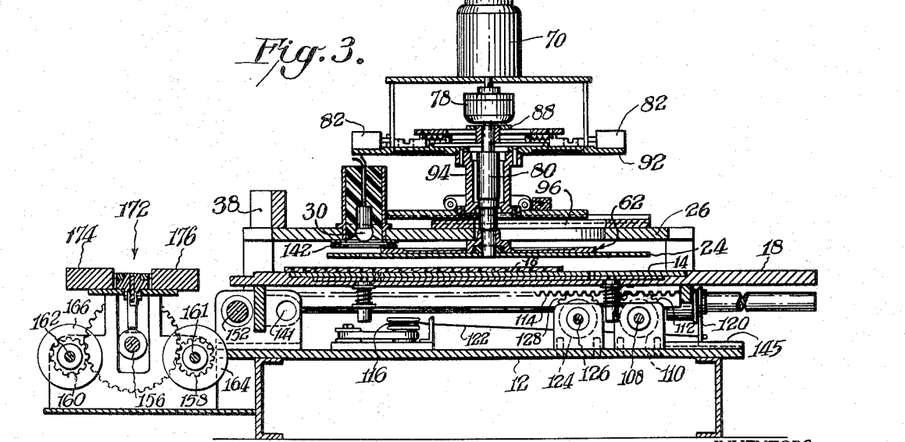
FIG. 3 is a cross-sectional view in elevation taken through FIG. 1 along the line 3—3.

In FIG. 1 is shown an apparatus 10 for composing musical copy which includes a stationary frame 12. A platen 14 is mounted within a table 18 supported upon frame 12 for receiving sheets of light-sensitive material 16, as shown in FIG. 3, upon which music copy is composed by the photographic methods described herein. Platen 14 is inserted within a rectangular recess 20, in table 18. A vertical translating means 22, which is for example automatically activated, as is later described, moves platen 14 and table 18 in their plane in a vertical direction relative to a musical staff disposed and exposed upon them. Translating means 22 is, therefore, designated as a vertical translating means even though its direction of movement is parallel to ground level.

A symbol magazine or disc 24 is mounted upon support plate 26 which is connected to slide laterally relative to frame 12 upon a pair of hinged slide bearings 28. A light source 30 is mounted upon support plate 26 adjacent disc 24, and an exposure station 32 under it is provided by aperture adjusting means 130, shown in FIGS. 1A and 1B.

A lateral translating means 34 reacts between frame 12 and support plate 26 for varying the relative lateral orientation of exposure or printing station 32 and platen 14 and light-sensitive material 16 mounted upon it. Lateral translating means 34 is for example manually actuated through a forwarding lever 36 in a manner later described in detail.

A reference arm 38 is connected to support plate 26, and it extends over reference table 18 to provide through the position of reference plate 40 relative to table 18 a visible indication of the relative positions of exposure station 32 and the light-sensitive material 16. Reference sheet 42 upon table 18 scanned by reference plate 40 includes for example a substantially accurately spaced layout staff 44 and a record staff 46. The precise lateral position of printing station 32 is indicated by reference line 48 inscribed upon reference plate 40, and horizontal reference line 50 crossing line 48 indicate the relative positions of the centerline of exposure station 32 relative to the staff on light-sensitive sheet 16. Angular aperture 52 on plate 40 indicates the corresponding position of exposure station 32 on record staff 46 through which a record of each exposed note is accurately applied to record staff 46.

A control panel 54 is electrically connected to apparatus 10 through electric conduit 56, and it includes a set of twenty-one push buttons 58 for activating vertical translating means 22 to position exposure station 32 at each of the vertical positions provided by and between the lines of a musical staff. Another set of thirty-six push buttons 60 is provided for actuating turntable 62 which automatically rotates each of the light passing images upon symbol disc 24 to exposure station 32 in a manner later described in detail. A foot-operated switch 64 is connected to operate light source 30 through a central circuit including an electrical conduit 66 (not fully shown) in a manner later described in detail. Foot switch 64 also actuates solenoid 68 as shown in FIG. 2 to lift platen 14 upwardly into contact with disc 24 in a manner later described in detail.

Figure 2:
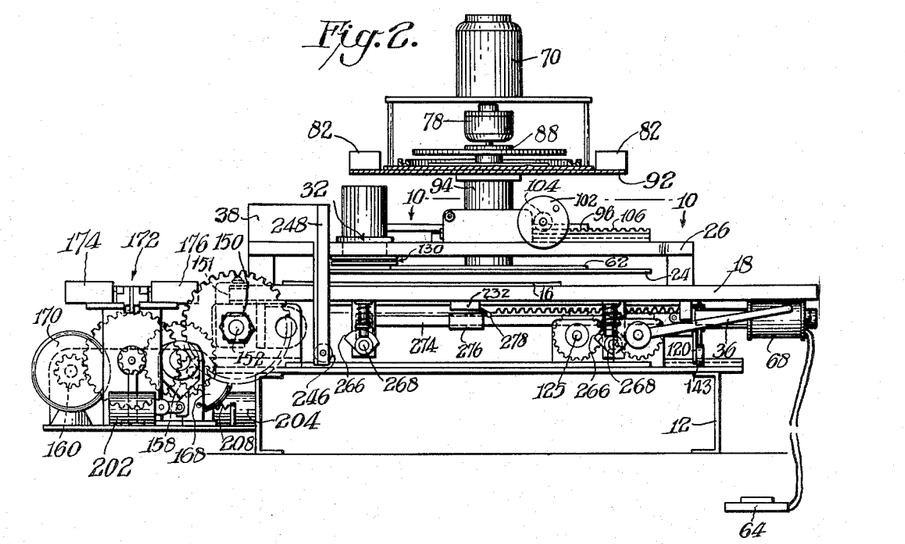
FIG. 2 is a front view in elevation of the embodiment shown in FIG. 1.
Figure 20:
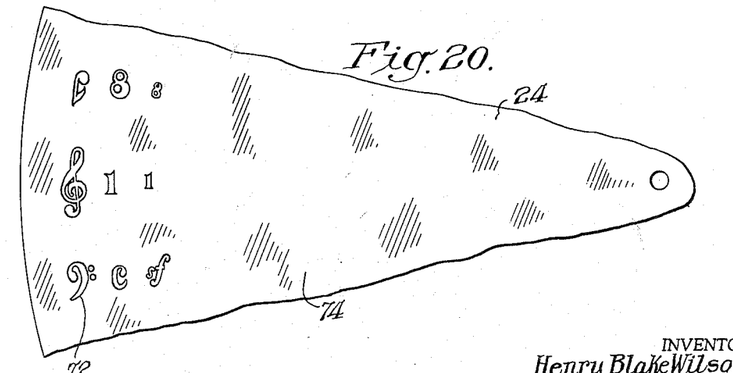

FIGS. 2 and 3 illustrate the front elevational dispositions of the elements shown in FIG. 1 which include motor 70 for rotating turntable 62 to which is attached disc 24, a portion of which is shown in FIG. 20. Rows of light-passing images 72 are formed about the periphery of disc 24 whose body 74 is, for example, opaque or black with images 72 of musical symbols being relatively light-transparent. These symbols include notes with and without stems which are superimposed in combinations to form all types of chords. Disc 24 is, for example, connected to round plate 76 of turntable 62 by screws (not shown).

Figure 8:
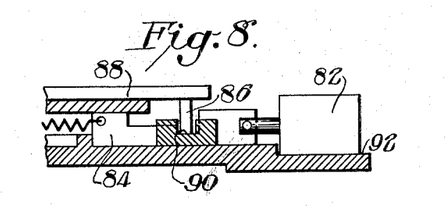
FIGS. 8–9 are enlarged cross-sectional views taken through FIG. 1 respectively along the lines 8—8 and 9—9.
Figure 9:
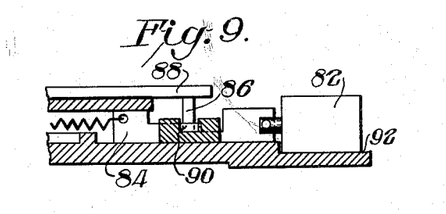

Motor 70 rotates continuously, and it is connected to rotate turntable 62 through a magnetic slip clutch 78 and a connecting shaft 80. The circular array of solenoids 82, shown in FIGS. 1–3, actuate plungers 84, also shown in FIGS. 8 and 9, to engage lug 86 upon radial arm 88. Plungers 84 include cutout sections 90, which in the extended condition shown in FIG. 8, permit free passage of lug 86. In the retracted phase of solenoids 82 shown in FIG. 9, plungers 84 obstruct passage of the lug 86 thereby arresting turntable 62 in a position disposing a pre-selected symbol image 72 at printing station 32.

Figure 10:
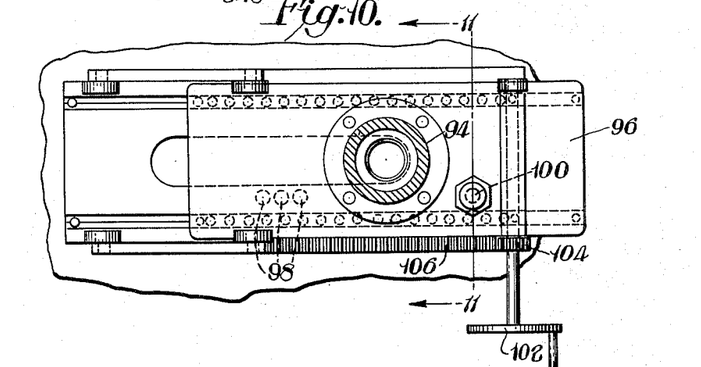
FIG. 10 is an enlarged cross-sectional view taken through FIG. 2 along the line 10—10.
Figure 11:
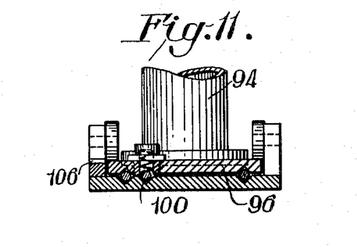
FIG. 11 is a cross-sectional view taken through FIG. 10 along the line 11—11.

Solenoids 82 are mounted upon a non-rotating base plate 92 supported upon a tubular column 94, which is in turn mounted upon a sliding carriage 96 also shown in FIGS. 10 and 11. Sliding carriage 96 is laterally shifted to several stations provided by detent lugs and depressions 98 which separately align each of the three rows of images 72 upon disc 24 with printing station 32.

Figure 12:
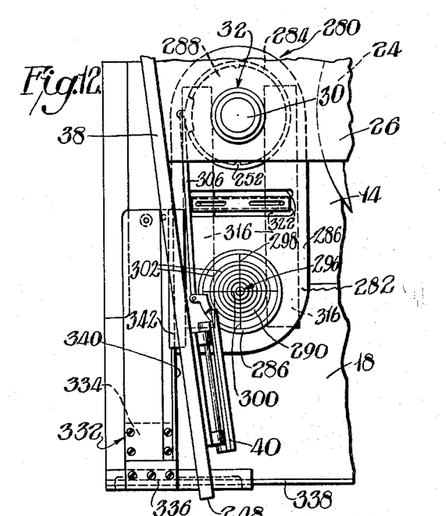
FIG. 12 is a plan view of a portion of the embodiment shown in FIG. 1 in conjunction with a bridging symbol fixture.

A fourth detent 100 is also shown in FIG. 10 for moving carriage 96 and the elements that it supports out of the path of light source 30 as shown by the position of disc 24 in FIG. 12. The sliding movement of carriage 96 is actuated by hand-operated wheel 102 which rotates pinion 104 in engagement with rack 106 as also shown in FIG. 2.

Figures 1B, 4:
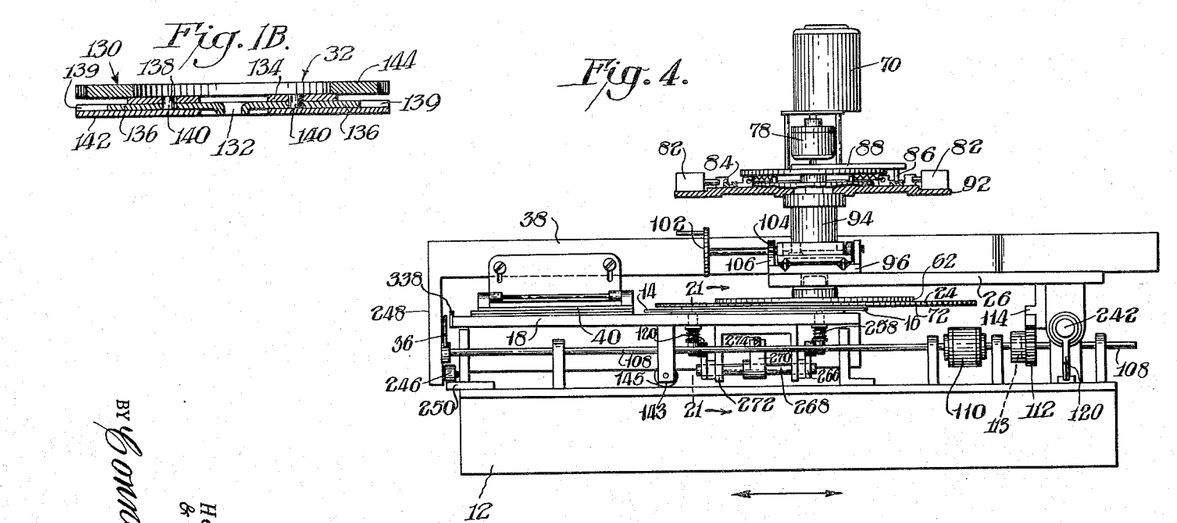
FIG. 1B is a cross-sectional view taken through FIG. 1A along the line 1B—1B.
FIG. 4 is a side view in elevation of the embodiment shown in FIG. 1.

FIGS. 2, 3 and 4 also show the manner in which lever 36 laterally translates support plate 26 with respect to table 18 and platen 14. Lever 36 is connected through a shaft 108 to magnetic clutch 110 which rotates pinion 112 through one-way drive 113. Pinion 112 is engaged with rear rack 114, attached to the underside of plate 26. This permits an infinite variation in the relative lateral positions of table 18 and exposure station 32 by an operator. A resiliently biased reel 116 reacts upon arm 120 connected to plate 26 through a cable 122 to resiliently bias plate 26 to the extreme left position. The force of reel 116 is resisted by magnetic brake 124, anchored to frame 12 through its shaft 125, which engages rear rack 114 through shaft 126 and pinion 128. While brake 124 remains energized, plate 26 is held laterally motionless. However, when brake 124 is deenergized, reel 116 acting through cable 122 against arm 120 pulls plate 26 to the extreme left, which is permitted by deenergization of one-way magnetic clutch 110. This provides a rapid means for returning plate 26 and printing station 32 and magazine 24 to the extreme left starting position.

FIGS. 1A and 1B show details of adjustable aperture means 130, which provides an aperture 132 at printing station 32. Adjustable aperture means 130 includes a reciprocating frame 134 which actuates the back and forth movement of a pair of aperture forming plates 136 through inclined slots 138 engaging pins 140 attached to plates 136. Plates 136 move laterally within a space 139 provided between fixed horizontal aperture forming plates 142, which are secured to circular ring 144 which attaches aperture forming device 130 to light source 30. Aperture 132 may accordingly be adjusted by reciprocating frame 134 to govern the size of the light beam passing from light source 30 to impinge upon image disc 24 and sheet 16 under it.

Vertical translating means 22 moves platen 14 and table 18 to slide together vertically upon bearing shaft 141 supported upon frame 12 and roller 143 which moves over horizontal surface 145 of frame 12. Table 18 is connected to a nut 150 engaged with a table-driving lead screw 152. Nut 150 is engaged with table 18 through an adjustable bracket 151 to permit shifting of the relative positions of table 18 and exposure station 32 for exposing a number of successive staffs upon sheet 16 if desired. Lead screw 152 is rotated through gear train 154. The ratio of gear train 154 may be varied by changing its gears to adjust the size of its staff movement. Control lead screw 156 drives gear train 154, and it is rotated as shown in FIG. 3 alternatively through a pair of pinions 158 and 160 respectively rotated by shafts 161 and 162 connected to magnetic slip clutches 164 and 166. Slip clutches 164 and 166 are respectively connected to the shafts of continuously running electric motors 168 and 170, which operate in opposite directions. The direction of rotation of control lead screw 156 is therefore, governed by energizing one of the other of magnetic clutches 164 or 166, and this selective energization is accomplished through control device 172 which is now described in detail.

Figure 6:
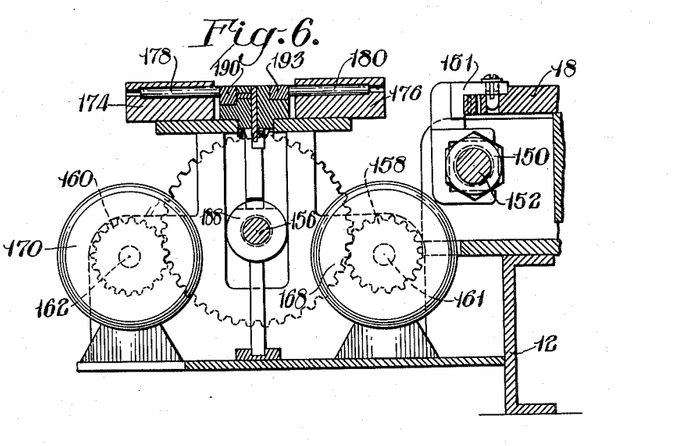
FIGS. 6 and 7 are cross-sectional views respectively taken through FIG. 1 along the lines 6—6 and 7—7.
Figure 7:
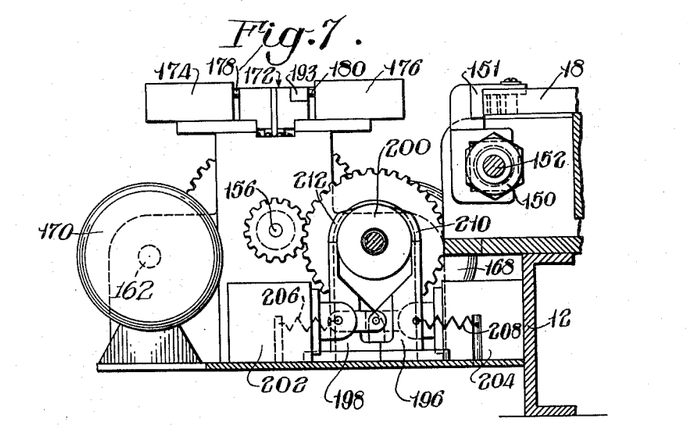
Figures 24, 24A:
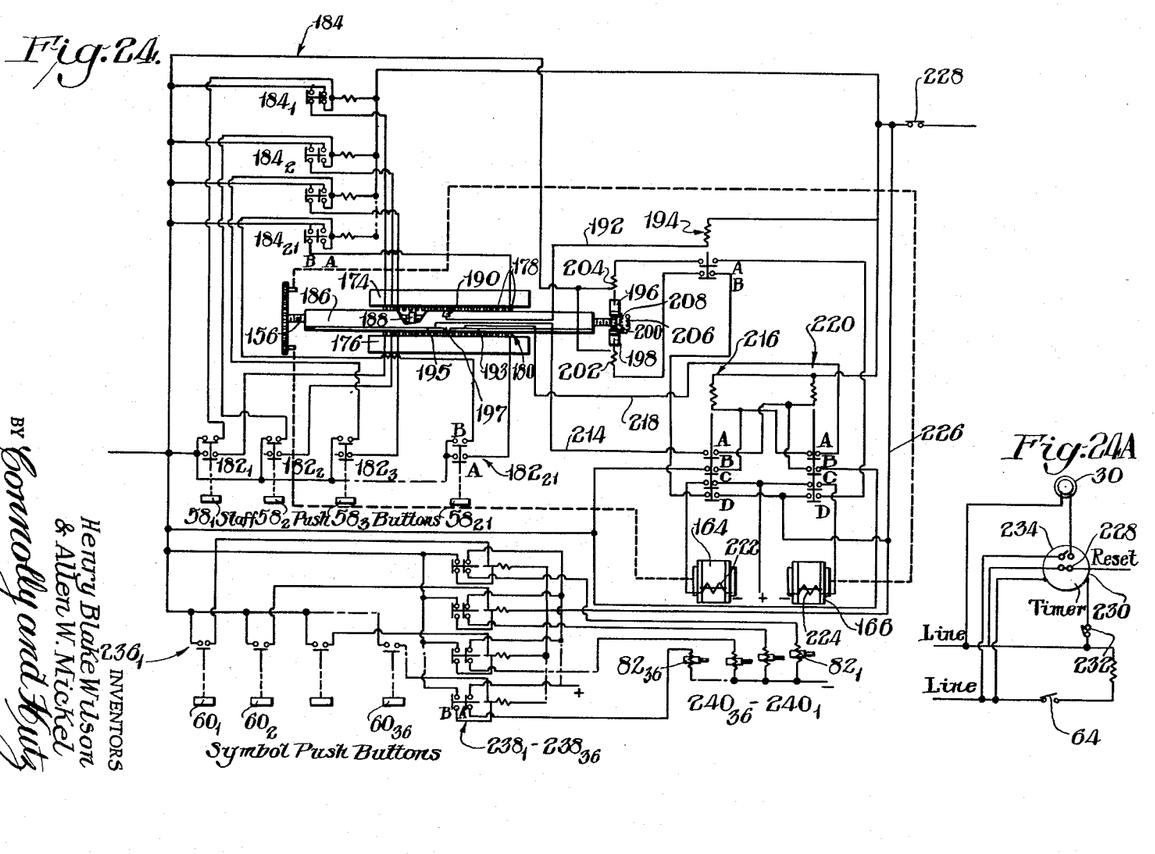
FIG. 24 is a schematic electrical diagram of the control circuit associated with the embodiment as shown in FIG. 1.
FIG. 24A is a supplement to FIG. 24.

Control device 172 includes a pair of stationary control bars 174 and 176, each of which are shown in FIGS. 6, 7 and 24 include an array of contact brush rods 178 and 180 arranged in opposed positions. Each set of oppositely disposed pairs of control rods or brushes 178 and 180 are connected to each other through the "A" contacts of vertical staff contact array 182 and associated relays 184 as shown in FIG. 24. Each set of contacts 182 is actuated by a corresponding staff spacing push buttons 58 as shown in FIG. 1. Movable contact rod 186 is connected to control lead screw 156 through nut 188 to cause it to move in synchronism with table 18. Movable control bar 186 includes on one side a central contact 190 which engages one set of brushes 178. On its other side a pair of elongated contact surfaces 193 and 195 which engage brushes 180 are separated by an insulated space 197.

Figure 7A:
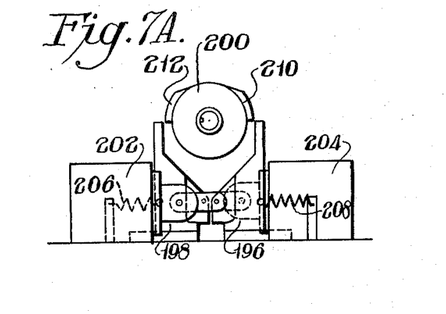
FIG. 7A is a cross-sectional view which is a portion of FIG. 7 in a disengaged phase of operation.

As shown in FIG. 24, central contact element 190 is connected through electrical line 192 to relay 194 which actuates fingers 196 and 198 which engage disc 200 to stop the rotation of control lead screw 156 each time in a uniform angular orientation. Solenoids 202 and 204 when energized, extend fingers 196 and 198 into engagement with discs 200. When solenoids 202 and 204 are de-energized springs 206 and 208 retract fingers 196 and 198. The physical relationship between fingers 196 and 198 relative to stop lugs 210 and 212 upon discs 200 are shown in FIGS. 7 and 7A respectively describing the engaged and disengaged positions.

The "B" contact of relay 194 is a holding contact as are the "B" contacts of contacts 182 and relays 184 to maintain them energized after initial actuation until released at the end of the control cycle as later described.

As also shown in FIG. 24, elongated contact bar 195 is connected through electrical line 214 to relay 216 which controls the energization of magnetic clutch 164 whose motor rotates in one direction. This energization is provided through the "A" contacts of this relay; and once it is closed it is maintained energized through holding contact "B" of this relay.

Elongated bar 193 is connected through electrical line 218 to relay 220 which controls the energization of magnetic clutch 164 whose motor rotates in the other direction through the "A" contact of relay 220 which is maintained thereafter energized through the "B" holding contact. Contacts "C" and "D" of relays 216 and 220 respectively complete the circuits to the armatures 222 and 224 of clutches 164 and 166 and to power supply line 226.

Power line or reset contactor 228 controls the energization of the entire circuit; and as shown in FIG. 24A, is operated by timer 230, which also controls light source 30. FIG. 24A also shows foot-operated switch 64 and limit switch 232 also shown in FIG. 2 which is actuated when platen 14 is upwardly raised as later described in conjunction with the description of FIGS. 21 and 22.

Elongated contacts 193 and 195 of control bar 186 thereby control the direction of rotation of lead screws 156 and 152 which respectively move control bar 186 and table 18 in synchronism vertically with respect to light source 30. When the one of vertical staff spacing contacts $182_1$–$182_{21}$ is actuated by its associated pushbuttons 58, this energizes one of clutches 164 or 166 in accordance with the disposition of the energized brush 180 relative to elongated contacts 193 and 195. If a brush bar 180 in contact with elongated bar 195 is energized, this energizes magnetic clutch 166 through relay 220 to rotate control lead screw 156 in a direction to cause energized brush 180 to move adjacent insulated space 197 between bars 193 and 195. At this time central contact 190 contacts the opposite energized brush 178 which through line 192, as previously described, energizes relay 194 to draw fingers 196 and 198 into arresting contact with lugs 210 and 212 upon disc 200 which stops it in a precise angular position as indicated in FIGS. 7 and 7A. Upon closing of foot switch 64 and limit switch 232, shown in FIG. 24A, timer 234 is actuated to energize light source 30 for its predetermined exposure time after which reset contact 228 is opened to restore the entire circuit to its initial condition.

Also shown in FIG. 24, are symbol contacts $236_1$–$236_{36}$, which control the rotation of turntable 62 to the proper image 72 selected upon disc 24. Symbol contacts $236_1$–$236_{36}$ are actuated by associated symbol pushbuttons 60 shown in FIG. 1. Contacts 236 are connected to respective relays $238_1$–$238_{36}$ which control the energization of associated solenoid windings $240_1$–$240_{36}$ which actuate turntable stopping solenoid 82. The "A" contacts of relays 238 initially energize them, and the "B" contacts are the holding contacts to maintain the relays 238 energized until resetting contact 228 opens.

Figures 5, 23:
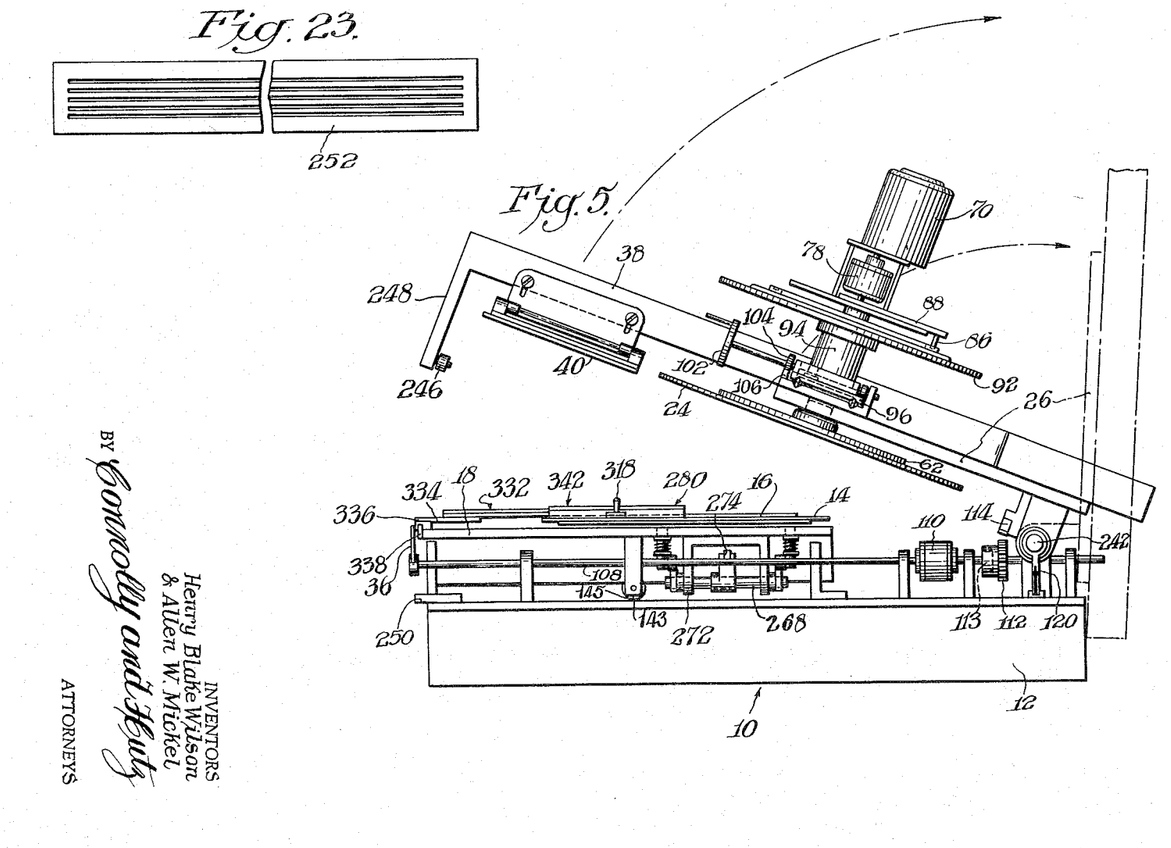
FIG. 5 is a side view in elevation similar to FIG. 4 with the apparatus in an open condition.
FIG. 23 is a plan view of light passing image of a musical staff for use in conjunction with the embodiment shown in FIG. 1.

FIG. 5 shows the raised position of plate 26 about hinge bar 242 to permit a light-sensitive sheet 16 to be placed in position upon platen 14. It also shows symbol disc 24 raised away from platen 14 to permit bridging symbol fixture 280, later described in detail, to be mounted over light-sensitive sheet 16 and reference table 18, as later described in detail. The extreme raised position of plate 26 is shown in broken outline in FIG. 5 to illustrate how complete access is obtained to platen 14 and table 18 when desired. One of rollers 246 attached to front edge 248 of plate 26, which engages flange 250 during lateral translation of plate 26 is also shown in FIG. 5.

FIG. 5 also illustrates the condition of apparatus 10 in which staff exposure image strip 252, shown in FIG. 23 on the same sheet as FIG. 5, can be applied to platen 14 over light-sensitive sheet 16 to expose the staff upon it prior to exposure of the various notes and symbols in a superimposed relationship.

Figures 19, 22:
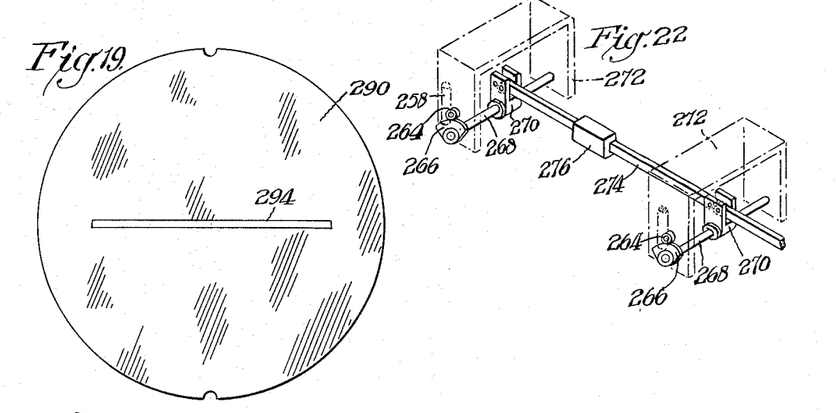
FIGS. 19 and 20 are respectively light passing images of musical symbols utilized in the apparatus shown in FIGS. 1 and 12.
FIG. 22 is a perspective view of the linkage shown in FIG. 21.
Figure 21:
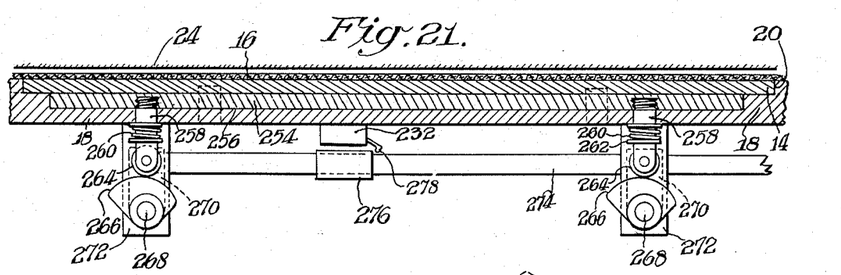
FIG. 21 is a cross-sectional view in elevation taken through FIG. 4 along the line 21—21.

In FIGS. 21 and 22 is shown the manner in which platen 14 is raised from its recess 20 in table 18 to raise light-sensitive sheet 16 into firm contact with disc 24 to provide a stable contact exposure. Platen 14 is mounted upon a lower plate 254 which rests within a lower recess 256 in table 18.

Two pairs of follower rods 258 extend downwardly from plate 254 which are resiliently urged to seat plate 254 in recess 256 by compression springs 260 reacting against rings 262. Springs 260 also maintain follower rods 258 engaged with their rollers 264 in contact with cams 266. Cams 266, as shown in FIG. 22, are secured to shafts 268 to which are also secured forks 270. Shaft 268 is freely rotatably mounted in bearings in inverted U-shaped brackets 272.

Rod 274 is rotatably connected with forks 270, and it is reciprocated back and forth by solenoid 68 shown in FIG. 2. Solenoid 68 is energized by foot-operated switch 64. When solenoid 68 pulls rod 274 to the right as shown in FIG. 22, this rotates the higher sections of cams 266 into contact with follower rollers 264 thereby raising plates 254 and 14 which presses sheet 16 into firm contact with image disc 24 to insure the obtaining of a true and accurate contact exposure. As rod 274 moves to the right, it also moves the projecting corner of collar 276 into engagement with actuating arm 278 of limit switch 232, which permits timer 230 to be energized to accomplish an exposure.

FIGS. 12–18 describe bridging symbol fixture 280 and the manner in which it is used to inscribe hooks and slurs upon notes exposed on light-sensitive material 16. FIG. 12 shows how bridging symbol fixture 280 is positioned at printing station 32 when image disc 24 is moved out of the way by carriage 96 shown in FIGS. 10 and 11.

Bridging symbol fixture 280 incorporates a base plate 282 including a pair of circular apertures 283 and 285 into which circular exposed frame 284 and reference frame 286 into which are respectively inserted exposure disc 288 and reference disc 290 as shown in FIGS. 13–19. Exposure disc 288 is replaceable and another form of exposure disc 290 is shown in FIG. 19 bearing another type of bridging symbol. Exposure disc 288, for example, includes a curved slur image 292, and exposure disc 290 includes a hook image 294. A series of slur discs 288 are provided with the lengths of slur graduated in $\frac{1}{16}$ inch increments. However, only one hook image 294 of maximum required length is required as later described. Only one reference frame 286 need be provided, and this includes a bullseye symbol 296 including cross lines 298 and 300 and a series of concentric circles 302. Frames 284 and 286 are connected to each other by a connecting rod 306 rotatably connected to arms 308 and 310 which rotate them in synchronized angular orientations. This permits the reference lines of bullseye 296 to be used as a guide for orienting a bridging symbol such as slur 292 upon the exposure notes of light-sensitive sheet 16 when bullseye 296 is correspondingly placed upon notes positions inscribed upon record staff 46. Concentric circles 302 indicate the length of slur 292, and horizontal reference line 300 at its junction with the proper concentric circles accurately indicates the end points of slur 292. This permits the record marks, such as 314 and 315 shown in FIG. 1, inscribed upon record staff 46 to be used as a guide for accurately superimposing photographic images of slurs 292 upon the corresponding exposed notes. The upward extending legs of reference marks 314 and 315 indicate that the stems of their corresponding notes extend upwardly, and their legs which extend laterally to the left indicate that the notes are disposed to the left of their stems.

Bridging symbol fixture 280 also includes a pair of parallel bars 316 mounted upon the bottom of plate 282, as shown more clearly in FIGS. 14–18. Parallel bars 316 are moved to variable positions parallel to each other by knobs 318 connected through pins 320 extending through slots 322 to bars 316. Bars 316 are maintained in accurate parallel alignment by guide yokes 323 attached to pairs of cylindrical bars 324 which move through slots 326. Parallel bars 316 are used for terminating the length of hook image 294 of FIG. 19. When bars 316 are aligned with record marks 328 and 330, as shown in FIG. 1, of a pair of notes to which a hook is to be applied, this automatically clips off the length of hook image 294 to the proper length and vertical edge shapes required for accurate musical copy. This facilitates the heretofore difficult problem of automatically applying hooks to notes to be bridged.

FIG. 12 also shows bracket 332 for aligning bridging fixture 280 upon table 18 and platen 14. Bracket 332, which is also shown in FIG. 5, includes a vertical leg 334 and a horizontal leg 336, which is hooked over the front guide flange 338 of table 18. Base plate 282 is engaged with edge 340 of bracket 332 by insertion of edge 340 within a vertical channel section 342 attached to the side of base plate 282.

The one-way magnetic clutch 110 drive to lateral table traversing pinion 112, shown in FIGS. 1–4, obtains its one-way action through a one-way drive 113 within the hub of pinion 112, which transmits motion from clutch 110 to pinion 112 only in the forward direction. A similar one-way drive 115 (not shown) of conventional structure is installed within the hub of pinion 128 which is connected to magnetic brake 124. Magnetic brake 124 is actually a magnetic clutch having one shaft 125 secured to frame 112.

*Operation*

In practicing this method upon apparatus 10, a sheet of light-sensitive material 16, such as photographic paper or film is attached to platen 14 which is dropped into place within recess 20 in table 18. A music layout 44 staff is then placed upon the reference surface area of table 18 in the position in which the junction between righting lines 48 and 52 correspond with the position of exposure station 32 with the staff on light-sensitive sheet 16 under. A blank record staff 46 is then disposed in a centered position under guide cutout surface 52 upon transparent reference plate 40. Both layout staff 44 and recording staff 46 may be applied upon a single sheet of paper 42 to maintain them in proper spacing in centered relationship under guide indicia 50 and 52.

The main power switch for apparatus 10 is then closed, and aperture 132 in adjustable means 130 opened to its widest sides aperture by movement of rectangular frame 134. Master staff negative 252 shown in FIG. 23 is then attached over light-sensitive material 16. At this time supporting plate 26 is rotated to the fully opened position shown in broken outline in FIG. 5 to provide full access to platen 14. Support 26 is then rotated to the closed position shown in FIGS. 1–4 and adjusted to its extreme left position by release of magnetic brake 124 and magnetic one-way clutch 110. Vertical translating means 22 is actuated to bring table 18 and platen 14 to a position which aligns exposure station 32 with a position corresponding to the centers of layout and recording staffs 44 and 46 by depressing the proper staff line pushbutton of array 58. Timer 230 is set to a maximum time condition, and turntable 62 and disc 24 moved to the extreme right position shown by the broken outline of disc 24 in FIG. 12 by movement of handwheel 102 to traverse carriage 96 to the remote detent position. This prevents disc 24 from interfering light transmitted through master staff negative 252. Footswitch 64 is then actuated to turn on light source 30, and supporting plate 26 carrying light source 30 is then immediately traversed to the right by actuation of feeding lever 36. An image of the staff is then exposed upon the light-sensitive material in a precisely aligned disposition with respect to the lateral path of motion of exposure station 32. A smooth and steady motion of supporting plate 26 by actuation of lever 36 evenly exposes the staff upon light-sensitive material 16. After this exposure master staff negative 252 is removed from light-sensitive material 16, and plate 26 allowed to be pulled back to the extreme left position by spring reel 116 by inactivation by magnetic brake 124 and magnetic one-way clutch 110.

Assuming that the most commonly used row of symbols disposed for convenience upon the outer row of disc 24 includes the symbols to be first used, carriage 96 is adjusted to the extreme left position shown in FIG. 1 by movement of handwheel 102 to align this outer row with exposure station 32. Adjustable aperture means 130 is then adjusted to an opening 132 corresponding to the width of the treble clef symbol which is the widest commonly used musical symbol. Timer 232 is then reset to provide its normal exposure time. Supporting hinge plate 26 is adjusted to its proper lateral position by manipulation of lever 36 to align sighting line 48 on reference plate 40 with the vertical centerline of the first symbol on the layout 44 which is the treble clef symbol shown in FIG. 1. The one of staff push buttons 58 corresponding to the centerline of the staff is then depressed to align the centerline of the exposed score on light-sensitive material 16 with the centerline of exposure station 32. If staff push buttons 58 have not been disturbed since exposure of the score, it will not be again necessary to depress the staff centerline push button.

The one of symbol push buttons 60 corresponding to the treble clef symbol is then depressed to cause turntable 62 to rotate by energization of magnetic slip clutch 78 which transmits the motion of rotating motor 70 to turntable 62. When the treble clef symbol image is aligned with exposure station 32, the solenoid 82 corresponding to this angular position moves from the position shown in FIG. 8 to the retracted position shown in FIG. 9 to interpose the solid portion of key 84 into the path of motion of projection 86 attached to turntable arm 88 which automatically arrests it at the desired angular orientation.

To complete the exposure, footswitch 64 is depressed which causes solenoid 68 to lift platen 14 upwardly to the position in which light-sensitive sheet 16 moves into firm contact with disc 24 at which time limit switch 232 is actuated by collar 276 on solenoid shaft 274 to complete the energization of timer 230 which permits the timed exposure to be commenced and accomplished.

By virtue of record marks such as 314, 315, 328 and 330, the exposures of all the remaining notes and symbols across staff layout 44 are then accomplished in a similar manner by actuation of lateral translation of supporting plate 26 to the right through manipulation of forwarding lever 36 which can align plate 26 and sighting line 48 in any infinitely adjusted position with respect to the notes and symbols on layout 44. The vertical staff positions of table 18 and platen 14 relative to exposure station 32 are obtained through actuation of the proper staff push button 58 which actuates vertical translating means 22 to traverse and accurately stop table 18 at the precise staff line or space resuired in the manner previously described. The desired preselected image symbol upon disc 24 is obtained in the previously described manner by actuation of the image symbol turntable 60 which rotates and accurately stops the predetermined image symbol within the center of exposure station 32. Each of push buttons 60 may provide one of three indicia of the three rows upon disc 24 which are selected by indexing carriage 96 to the desired detent. The most commonly used symbols are conveniently arranged upon the outer row of disc 24. Furthermore, a blank station can be provided on disc 24 into which additional image symbols can be inserted from a supplementary library to make any conceivable symbol available.

Figures 13, 14, 15, 18:
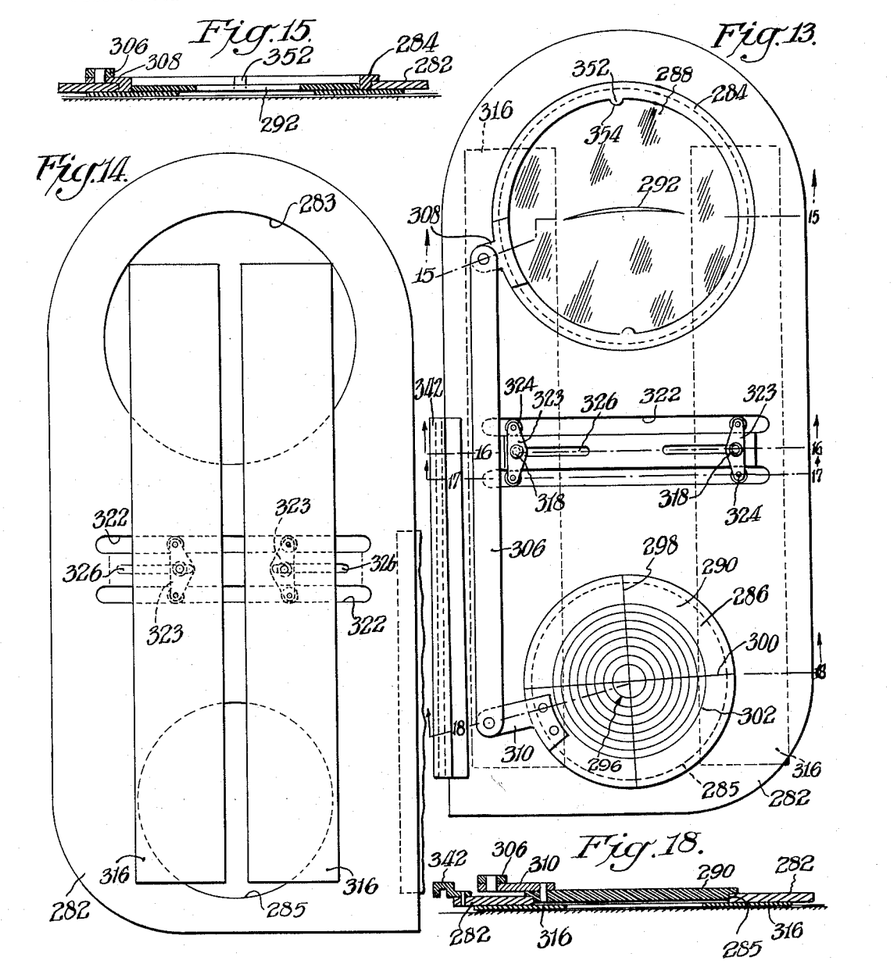
FIG. 13 is an enlarged plan view of the bridging symbol fixture shown in FIG. 12.
FIG. 14 is a bottom plan view of the fixture shown in FIG. 13.
FIGS. 15–18 are respectively cross-sectional views taken through FIG. 13 along the lines 15—15, 16—16, 17—17 and 18—18.
Figure 16:
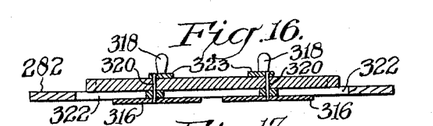
Figure 17:
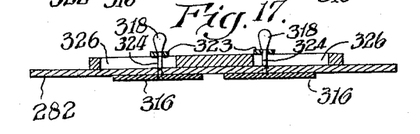

The positions of the exposed notes to a cross switch bridging symbols such as slurs and hooks must be applied are inscribed on staff record 46 through guide surface aperture 52, for applying these bridging symbols fixture 280 is mounted upon table 18 and platen 14 as shown in FIGS. 5 and 12 with disc 24 shifted together with its turntable 62 to its extreme right position shown in FIG. 12 to move disc 24 away from exposure station 32. To apply a slur 350 as shown in FIG. 1, supporting plate 26 is moved by forwarding lever 36 to the point in which the indicated length of reference line 300 on bullseye 296 connects the vertical portions of recorded mark 314 and 315 on record staff 46. Bridging symbol fixture 280 shown in FIGS. 12–18 is prepared for application of slurs 350 by insertion of slur image plate 288 into exposure frame 284, as shown in FIG. 13. Slur plate 288 is chosen from the library of such plates which provide slur images 292 in 1/16 inch length increments. The bullseye reference disc 296 of fixture 280 is then aligned with the record marks 314 and 315 in a position which aligns the indicated length on horizontal bullseye 300 across marks 314 and 318. The angular orientation of line 300 is adjusted by rotating reference frame 286 which simultaneously adjusts the angular orientation of exposure frame 284 and its slur disc 288 keyed in proper angular orientation with frame 284 by projections 352 and indentations 354. The vertical position of the centerline of the bullseye 300 may be adjusted by actuation of the proper staff push button 58 since its correspondence with exposure station 32 must be maintained.

When fixture 280 is used to apply a hook, such as hook 356 shown in FIG. 1, the single hook image symbol plate 290 shown in FIG. 19 is snapped into exposure frame 284 and its alignment with respect to record marks 328 and 330 accurately obtained by depression of the proper staff push button 58 and rotation of reference frame 286. Cutoff bars 316 are then accurately aligned with the vertical legs of record marks 328 and 330 to cut off the ends of hook image 294 extending beyond marks 328 and 330 and also beyond the corresponding stems of their exposed notes. Adjustment of parallel cutoff bars 316 is accomplished by manipulation of knobs 318. The exposure of the proper hook length is then obtained in accurate relationship to exposed notes corresponding to record marks 328 and 330 because parallel bars 316 cut off the unwanted portions of hook image 294.

After a line or lines of music copy are exposed in the aforementioned manner, light-sensitive material 16 is removed from the apparatus and then developed, rinsed, fixed and washed as in any normal photographic procedure. The illustrated apparatus 10 can handle as many as three successive lines of music copy, and provisions may be made for handling even an entire page if desired.

When each exposed sheet 16 is less than a full page, they are assembled together to form a full sheet of music and then photographed upon a photoreproduction master which is then reproduced in the conventional manner to provide a remarkably accurate and attractive sheet of music which meets the standards and requirements of even the most discriminating musician. The results of this method and apparatus are superior in regularity and fidelity even to the product made by hand engraving upon metal plates performed by the most experienced craftsman. This is quite remarkable in view of the fact that heretofore available automatic methods have fallen far short of the minimum requirements for fine music copy, which has to date left the entire market for such copy to the arduous hand engraving process which can only be performed by the most skilled of craftsmen.

What is claimed is:

1. A method of composing music copy including notes, symbols and bridging symbols which comprises the steps of preparing a substantially accurately spaced layout of said copy, photographically exposing the notes and symbols of said copy on light sensitive material in positions substantially corresponding to their arrangement upon said layout, marking a substantially permanent accurate record of the vertical and lateral spacing of said exposed notes at a location remote from said notes which is visible to an operator, and subsequently exposing the lateral bridging symbols of said copy upon said light-sensitive material in positions, lengths and angular orientations corresponding to said accurate record of said vertical and lateral spacing of said exposed notes by using said accurate record as a reference for said positions, lengths and angular orientations and by varying said lengths and angular orientations of said bridging symbols with reference to said record.

2. A method as set forth in claim 1 wherein said notes and said bridging symbols are photographically exposed by a contact printing process.

3. An apparatus for composing music copy comprising a stationary frame, a sheet of light sensitive material, a table mounted upon said frame for supporting said sheet of light sensitive material, a symbol magazine incorporating light-passing images of a variety of musical symbols, a source of light mounted upon said frame for directing light upon said platen, an exposure station positioned in front of said source of light, symbol image feeding means connected to said magazine for selecting a predetermined symbol image and disposing it at said exposure station between said light source and said light sensitive material, translating means reacting between said exposure station and said table through said frame for varying the vertical and lateral orientation of said exposure station relative to a musical staff imprinted upon said sheet disposed upon said table, part of said table extending visibly outside of said apparatus to provide a reference surface, a reference arm connected to said exposure station and extending over said reference surface for providing a visible indication of the relative positions of said exposure station and said light sensitive material, said reference surface including a guide surface for marking an accurate record of the vertical and lateral spacings of the images of notes printed upon said sheet of light sensitive material at said exposure station at a location remote from them which is visible to an operator, said symbol magazine comprising a disc having said light-passing images disposed about its periphery, said disc being mounted upon a turntable, said turntable and said exposure station being mounted upon a supporting plate, rotating means mounted upon said supporting plate and connected to said turntable, rotary indexing means mounted upon said supporting plate and connected to said turntable for accurately positioning said predetermined symbol images at said printing station, said rotating means comprising a motor, said motor being connected to said turntable through a slip-clutch, said rotary indexing means incorporating power-operated keys disposed about the periphery of said turntable, a projection extending from said turntable into the path of motion of said keys, electrical control means associated with said slip-clutch and said power-operated keys for energizing said slip-clutch to cause rotation of said turntable and motion of one of said keys into the path of rotation of said projection to cause said turntable to be arrested when said pre-selected symbol image is disposed at said exposure station, said power-operated keys comprising an array of solenoid-operated keys disposed in slides about the periphery of said turntable, and said keys including indentations which permit the through passage of said projection when they are not actuated.

4. An apparatus for composing music copy comprising a stationary frame, a sheet of light sensitive material, a table mounted upon said frame for supporting said sheet of light sensitive material, a symbol magazine incorporating light-passing images of a variety of musical symbols, a source of light mounted upon said frame for directing light upon said platen, an exposure station positioned in front of said source of light, symbol image feeding means connected to said magazine for selecting a predetermined symbol image and disposing it at said exposure station between said light source and said light sensitive material, translating means reacting between said exposure station and said table through said frame for varying the vertical and lateral orientation of said exposure station relative to a musical staff imprinted upon said sheet disposed upon said table, part of said table extending visibly outside of said apparatus to provide a reference surface, a reference arm connected to said exposure station and extending over said reference surface for providing a visible indication of the relative positions of said exposure station and said light sensitive material, said reference surface including a guide surface for marking an accurate record of the vertical and lateral spacings of the images of notes printed upon said sheet of light sensitive material at said exposure station at a location remote from them which is visible to an operator, said light source and said exposure station being disposed adjacent said platen, said exposure station comprising an aperture-adjusting means, said table incorporating a platen, said platen being connected to the remainder of said table by projection and socket means which permits said platen to be raised above said remainder of said table, and lifting means connected to said platen for raising a sheet of light sensitive material mounted upon it into contact with said predetermined symbol image disposed at said exposure station whereby the provision of an accurately formed and positioned contact exposure upon said light sensitive material is facilitated.

5. An apparatus as set forth in claim 4 wherein sliding bearings connect said table to said frame for permitting said table to be moved in its plane in said vertical directions normal to its length, said vertical translating means reacting between said frame and said table for actuating movement of said table in said vertical staff directions relative to said frame, and staff indexing means connected with said vertical translating means for accurately positioning said table relative to said exposure station at positions corresponding to the liner and spacer of said staff.

6. An apparatus as set forth in claim 5 wherein said vertical translating means comprises a table-driving lead screw and nut, a motor means, said motor means being connected to said table-driving lead screw through a slip-clutch, said table being connected to said nut, said staff indexing means comprising a rotating disc bearing projections connected to rotate with said table-driving lead screw, movable finger means, actuating means connected to said movable finger means for moving them into and out of engagement with said projections upon said disc and a staff indexing control means for energizing said slip-clutch means to rotate said table-driving lead screw and nut to positions which provide said predetermined positions of said staff lines and spaces relative to said printing station and for controlling the engagement and disengagement of said movable finger means with said projection upon said disc.

7. An apparatus as set forth in claim 6 wherein said motor means comprise a pair of electric motors each having an output shaft connected to a slip clutch, said motors being arranged to rotate said table-driving lead screw in opposite directions, and said staff indexing control means being arranged to alternately energize said slip-clutches to cause said lead screw to rotate in opposite directions.

8. An apparatus as set forth in claim 7 wherein said staff indexing control means incorporates a control lead screw which is connected to rotate in synchronism with said table-driving lead screw, a pair of stationary contact bars mounted parallel to said control lead screw, each of said contact bars carrying oppositely disposed rows of brush contacts corresponding in number and arrangement to the number of lines and spaces of a musical staff, a movable contact bar mounted between said contact brushes, control nut means connecting said movable contact bar to said control lead screw for moving said movable contact bars back and forth in response to movement of said control lead screw, said movable contact bar having a central contact upon one side which engages one of said row of brush contacts, said movable contact bar also incorporating a pair of elongated contacts upon its other side in contact with said other row of brush contacts, said elongated contacts being separated from each other at an insulated central position in line with said central contact, each of said elongated contacts being separately electrically connected to actuate separate ones of said slip clutches for selecting the direction of rotation of said lead screw, said movable finger means being operated by finger relay means, said central contact being connected to actuate said finger relay means for engaging said fingers with said projections upon said disc whenever said central contact engages a selected brush contact, and a selective array of contacts corresponding to each of said opposite pairs of contacts upon said stationary contact bars for selectively closing said pair corresponding to the staff position upon said table which is to be positioned at said exposure station by said vertical translating means.

9. An apparatus as set forth in claim 8 wherein said light passing images include a variety of lengths of slurs and a single hook image of maximum length, a pair of light obstructing bars, slide connections mounting said bars across said frames to permit them to move back and forth into corresponding positions across said frames for cutting off the length of said hook image to correspond to its required length as indicated by said note record visible through said frame upon said reference surface.

10. An apparatus for composing music copy comprising a stationary frame, a sheet of light sensitive material, a table mounted upon said frame for supporting said sheet of light sensitive material, a symbol magazine incorporating light-passing images of a variety of musical symbols, a source of light mounted upon said frame for directing light upon said platen, an exposure station positioned in front of said source of light, symbol image feeding means connected to said magazine for selecting a predetermined symbol image and disposing it at said exposure station between said light source and said light sensitive material, translating means reacting between said exposure station and said table through said frame for varying the vertical and lateral orientation of said exposure station relative to a musical staff imprinted upon said sheet disposed upon said table, part of said table extending visibly outside of said apparatus to provide a reference surface, a reference arm connected to said exposure station and extending over said reference surface for providing a visible indication of the relative positions of said exposure station and said light sensitive material, said reference surface including a guide surface for marking an accurate record of the vertical and lateral spacings of the images of notes printed upon said sheet of light sensitive material at said exposure station at a location remote from them which is visible to an operator, said lateral translating means comprising a rack and pinion, said exposure station and said light source being mounted upon a supporting plate arranged upon said frame above said table, said supporting plate being mounted upon slide bearings for lateral movement relative to said table, said rack being connected to said frame, a manually operable lever connected to a shaft, a one-way clutch connecting said shaft to rotate said pinion to cause said supporting plate to be moved precisely laterally relative to said table upon actuation of said lever, a resilient means biasing said supporting plate to move to an extreme position laterally relative to said table, brake means reacting upon said supporting plate to hold it motionless, and brake releasing means connected to said brake to permit said supporting plate to move to said extreme position relative to said table.

11. An apparatus as set forth in claim 10 wherein said one way clutch and brake means are magnetically actuated, said clutch and said brake being connected to said rack through separate pinions, and said magnetic brake and clutch slipping to allow independent movement of said pinion connected thereto.

12. An apparatus for composing music copy comprising a stationary frame, a sheet of light sensitive material, a table mounted upon said frame for supporting said sheet of light sensitive material, a symbol magazine incorporating light-passing images of a variety of musical symbols, a source of light mounted upon said frame for directing light upon said platen, an exposure station positioned in front of said source of light, symbol image feeding means connected to said magazine for selecting a predetermined symbol image and disposing it at said exposure station between said light source and said light sensitive material, translating means reacting between said exposure station and said table through said frame for varying the vertical and lateral orientation of said exposure station relative to a musical staff imprinted upon said sheet disposed upon said table, part of said table extending visibly outside of said apparatus to provide a reference surface, a reference arm connected to said exposure station and extending over said reference surface for providing a visible indication of the relative positions of said exposure station and said light sensitive material, said reference surface including a guide surface for marking an accurate record of the vertical and lateral spacings of the images of notes printed upon said sheet of light sensitive material at said exposure station at a location remote from them which is visible to an operator, said lateral translating means comprising a rack and pinion, said exposure station and said light source being mounted upon a supporting plate arranged upon said frame above said table, said supporting plate being mounted upon slide bearings for lateral movement relative to said table, said rack being connected to said frame, a manually operable lever connected to a shaft, a one-way clutch connecting said shaft to rotate said pinion to cause said supporting plate to be moved precisely laterally relative to said table upon actuation of said lever, said light source, said symbol magazine and said feeding means being mounted upon a supporting plate, said supporting plate being hinged to said frame upon said slide bearings to permit said symbol image magazine and light source mounted upon said supporting plate to be moved away from said table to provide access thereto, and said lateral translating means reacting between said frame and said supporting plate for moving said supporting plate laterally relative to said table.

13. An apparatus as set forth in claim 12 wherein said reference arm is connected to said supporting plate for movement therewith relative to said reference surface upon said table.

14. An apparatus for composing music copy comprising a stationary frame, a sheet of light sensitive material, a table mounted upon said frame for supporting said sheet of light sensitive material, a symbol magazine incorporating light-passing images of a variety of musical symbols, a source of light mounted upon said frame for directing light upon said platen, an exposure station positioned in front of said source of light, symbol image feeding means connected to said magazine for selecting a predetermined symbol image and disposing it at said exposure station between said light source and said light sensitive material, translating means reacting between said exposure station and said table through said frame for varying the vertical and lateral orientation of said exposure station relative to a musical staff imprinted upon said sheet disposed upon said table, part of said table extending visibly outside of said apparatus to provide a reference surface, a reference arm connected to said exposure station and extending over said reference surface for providing a visible indication of the relative positions of said exposure station and said light sensitive material, said reference surface including a guide surface for marking an accurate record of the vertical and lateral spacings of the images of notes printed upon said sheet of light sensitive material at said exposure station at a location remote from them which is visible to an operator, a reference plate being connected to said reference arm, and a lateral position sighting line upon said reference plate for indicating a position upon said reference surface corresponding to the vertical centerline of said exposure station.

15. An apparatus as set forth in claim 14 wherein said symbols include notes and bridging symbols, a recording surface is mounted upon said reference plate to permit a record to be made of note exposure positions of said reference plate for facilitating the accurate placement of said bridging symbols relative to said notes exposed upon said light sensitive material.

16. An apparatus as set forth in claim 14 wherein guide surfaces comprise a slot having a pair of substantially directed vertical arms connected by a lateral arm which is bisected by said lateral position sighting line.

17. An apparatus as set forth in claim 14 wherein hinge means connects said reference plate to said reference arm to permit said reference plate to be moved out of the way of an operator.

18. An apparatus for composing music copy comprising a stationary frame, a sheet of light sensitive material, a table mounted upon said frame for supporting said sheet of light sensitive material, a symbol magazine incorporating light-passing images of a variety of musical symbols, a source of light mounted upon said frame for directing light upon said platen, an exposure station positioned in front of said source of light, symbol image feeding means connected to said magazine for selecting a predetermined symbol image and disposing it at said exposure station between said light source and said light sensitive material, translating means reacting between said exposure station and said table through said frame for varying the vertical and lateral orientation of said exposure station relative to a musical staff imprinted upon said sheet disposed upon said table, part of said table extending visibly outside of said apparatus to provide a reference surface, a reference arm connected to said exposure station and extending over said reference surface for providing a visible indication of the relative positions of said exposure station and said light sensitive material, said reference surface including a guide surface for marking an accurate record of the vertical and lateral spacings of the images of notes printed upon said sheet of light sensitive material at said exposure station at a location remote from them which is visible to an operator, said symbol magazine including an angularly adjustable fixture, said fixture including a pair of rotatable frames, a coupling linkage connecting said pair of frames in a manner which maintains them in corresponding angular orientations, one of said pair of frames being disposed at said exposure station when the other of said frames is disposed upon said reference surface, said frame disposed at said exposure station including means for inserting light-passing images of bridging symbols, and said frame disposed upon said reference surface incorporating angular reference indicia for guiding the orientation of said frames with respect to the notes across which said bridging symbols are exposed.

19. An apparatus as set forth in claim 18 wherein a mounting bracket extends from said fixture, and said mounting bracket engages said table for mounting said frames in a precise position upon said table and with respect to said exposure station.

20. An apparatus as set forth in claim 18 wherein a parallelogram linkage connects said frames to rotate in angular synchronism with each other.

References Cited in the file of this patent

UNITED STATES PATENTS

| | | |
|---|---|---|
| 1,166,504 | Webster | Jan. 4, 1916 |
| 1,732,049 | Hunter | Oct. 15, 1929 |
| 2,010,561 | Ogden | Aug. 6, 1935 |
| 2,791,162 | Snyder | May 7, 1957 |
| 2,976,787 | Robbins | Mar. 28, 1961 |

FOREIGN PATENTS

| | | |
|---|---|---|
| 679,930 | Great Britain | Sept. 24, 1952 |